(12) United States Patent
Gruber et al.

(10) Patent No.: US 7,841,625 B2
(45) Date of Patent: Nov. 30, 2010

(54) OFF-ROAD COMPETITION MOTORCYCLE

(75) Inventors: Robert Gruber, Seekirchen am Wallersee (AT); Johann Trunkenpolz, Maria Schmolln (AT)

(73) Assignee: KTM Sportmotorcycle AG, Mattighofen (AT)

( * ) Notice: Subject to any disclaimer, the term of this patent is extended or adjusted under 35 U.S.C. 154(b) by 571 days.

(21) Appl. No.: 11/821,814

(22) Filed: Jun. 26, 2007

(65) Prior Publication Data

US 2008/0000707 A1  Jan. 3, 2008

(30) Foreign Application Priority Data

Jun. 29, 2006 (DE) ................. 10 2006 029 974

(51) Int. Cl.
*B62K 11/04* (2006.01)
(52) U.S. Cl. ...................... 280/835; 180/219
(58) Field of Classification Search ........... 280/833, 280/834, 835; 180/218, 219
See application file for complete search history.

(56) References Cited

U.S. PATENT DOCUMENTS

| 4,311,261 | A | * | 1/1982 | Anderson et al. ........... 224/418 |
| 4,396,084 | A | * | 8/1983 | Yoshimura et al. .......... 180/219 |
| 4,577,719 | A | | 3/1986 | Nomura et al. |
| 4,694,924 | A | * | 9/1987 | Asakura et al. ............ 180/68.3 |
| 4,799,569 | A | | 1/1989 | Hattori et al. |
| 5,127,560 | A | | 7/1992 | Miyamoto et al. |
| 5,388,660 | A | * | 2/1995 | Shirasagi et al. ............ 180/219 |
| 5,729,974 | A | | 3/1998 | Takashima |
| 7,377,552 | B2 | * | 5/2008 | Miyabe ...................... 280/835 |
| 7,484,766 | B2 | * | 2/2009 | Iwasaki ...................... 280/833 |

FOREIGN PATENT DOCUMENTS

| DE | 38 24 680 A1 | 2/1989 |
| DE | 44 35 036 A1 | 4/1996 |
| DE | 102 38 768 A1 | 4/2003 |
| EP | 1 245 423 A2 | 10/2002 |
| GB | 2 037 678 A | 7/1980 |
| GB | 2 169 253 A | 7/1986 |
| JP | 03-109188 A1 | 5/1991 |
| JP | 04-189691 A1 | 7/1992 |
| JP | 08-230743 A1 | 9/1996 |

* cited by examiner

*Primary Examiner*—Tony H. Winner
(74) *Attorney, Agent, or Firm*—Rod D. Baker

(57) ABSTRACT

An off-road motorcycle apparatus. There is provided is an off-road competition motorcycle comprising an internal combustion engine (2), having at least one cylinder, and a front wheel (3) as well as a rear wheel (4), a tubular trellis frame (5) and a self-supporting fuel tank configured as a rear tank (11) mounted at the rear end of the off-road competition motorcycle, releasably secured to the tubular trellis frame (5), wherein the rear tank (11) is the sole fuel tank of the off-road competition motorcycle and a lower portion of the rear tank (11) extends by its bottom (16) in the yaw axis direction of the off-road competition motorcycle (1) into the region of one end of the tubular trellis frame (5).

26 Claims, 4 Drawing Sheets

OFF-ROAD COMPETITION MOTORCYCLE

CROSS-REFERENCE TO RELATED APPLICATIONS

This application claims priority to German Patent Application No. DE 10 2006 029 974.4, filed on Jun. 29, 2006.

BACKGROUND OF THE INVENTION

1. Field of the Invention (Technical Field)

The present invention relates to motorcycles, particularly to an off-road competition motorcycle comprising an internal combustion engine having at least one cylinder, and a front wheel as well as a rear wheel, a tubular trellis frame and a self-supporting fuel tank configured as a rear tank mounted at the rear end of the off-road competition motorcycle, releasably secured to the tubular trellis frame.

2. Background Art

Motorcycles, quite generally, and also those intended for biking cross-country, in other words off-road competition motorcycles, normally feature a fuel tank disposed between the handlebars and the biker when seated on the motorcycle. Such a fuel tank is usually termed saddle tank, because it features side tanks downswept about the frame of the motorcycle like the flaps of a saddle to provide a corresponding amount of fuel. The term "off-road competition motorcycle" in this context is also to be understood to include a motorcycle featuring tires for biking on a solid pavement, featuring a spring suspension at the front wheel and rear wheel for competition racing on rough terrain, often termed a "supermoto."

When a motorcycle is intended to cover long distances without having to stop for refuelling, it is necessary to increase the capacity of the fuel tank. This means that when the saddle tank is full, the force acting vertically on the footprint of the front wheel of the motorcycle is significantly increased. The fuel thus results in an increase in the deadweight of the motorcycle in accordingly significantly increasing the load on the front wheel of the motorcycle, resulting in the motorcycle becoming nose-heavy. The increasing reduction in the level of the fuel in the saddle tank results in a change in the mass distribution of the motorcycle with a significant change in the load on the front wheel during operation of the motorcycle and thus also with a change in the handling response of the motorcycle.

So as to increase the mileage achievable with a single filling of the fuel tank, it is also known to provide auxiliary tanks rear mounted on the motorcycle which together with the saddle tank disposed between seat and handlebars add to the achievable mileage. A motorcycle featuring a saddle tank and an additional tank in the form of a rear-mounted auxiliary tank is known, for example, from U.S. Pat. No. 4,799,569 B1. The motorcycle known from this document comprises a double cradle tubular frame provided with an auxiliary tank at the rear, which thus has no supporting function.

Known from U.S. Pat. No. 5,127,560 is a motorcycle featuring space for accommodating accessory items such as a helmet, instead of a saddle tank as is usual at this location, as well as a rear tank which, however, is not configured self-supporting since it is secured to the rear frame of the motorcycle.

Known from the United Kingdom Patent GB 2 037 678 A is a motorcycle featuring a self-supporting rear tank as the sole tank located below the seat of the motorcycle and extending to the region of a central bridge in the frame of the motorcycle.

U.S. Pat. No. 4,577,719 seems to show a motorcycle fuel system having a main tank disposed between outboard tubular elements of the motorcycle frame with an auxiliary tank below the seat of the motorcycle. In this arrangement, the main tank and the auxiliary tank are fluidly communicated via a connecting conduit.

In addition to the aforementioned double cradle frame, other frame structures for motorcycles are known; for instance, the central tube frame or bridge frame which simultaneously enclose the engine of the motorcycle, or also the tubular trellis frame configured as a framework forming framework bridges on both sides of the engine enclosed thereby. Such a tubular trellis frame features high rigidity due to the framework structure.

Also known from the German motorcycle magazine "MOTORRAD," No. 13, 2006, at page 16, is an off-road competition motorcycle featuring an internal combustion engine, having one cylinder, and a front wheel as well as a rear wheel, a tubular trellis frame, and a self-supporting fuel tank configured as a rear tank mounted at the rear end of this off-road competition motorcycle. In addition to the self-supporting rear tank, this off-road competition motorcycle features for extra mileage two fuel tanks usually disposed between the seat of the motorcycle and the handlebars, i.e., in a location in front of the seated biker of this known off-road competition motorcycle.

The intention with this off-road competition motorcycle is, no matter whether the fuel tank is full or almost empty, to achieve stable handling over a broad operating range so that the biker can concentrate on the surface ahead, such as surface irregularities to be negotiated without biking being made difficult by the response of the motorcycle being significantly influenced by the fuel level.

In addition, the motorcycle is intended to make it possible that the power furnished by the engine to be communicated also to a loose or slippy surface without the driven rear wheel losing its grip all the time. In addition, the motorcycle is designed to enable the biker to negotiate an obstacle in the form of a stone or other surface irregularity by yanking up the front wheel from the surface in overcoming the obstacle without the front wheel being jolted by the obstacle, ruining the smooth handling of the motorcycle and introducing unsteadiness into the chassis of the motorcycle.

When the off-road competition motorcycle then features a front tank mounted between the biker and handlebars in the form of a saddle tank or the like, this results in a nose-heavy configuration when the fuel tank is full which makes it difficult to yank up the front wheel from the surface. When such an off-road competition motorcycle is negotiating a downhill loose surface, the braking force communicated by the front wheel is diminished because of the front wheel almost instantly losing grip and resulting in skidding and toppling of the motorcycle. It is thus important to communicate the corresponding braking power with the rear wheel which in this context, however, because of the fuel in the saddle tank being sloshed forward downhill is relieved of load in thus reducing the force normal to the rear wheel.

With the foregoing summaries as background, the object of the present invention is thus to sophisticate the known off-road competition motorcycle to avoid the aforementioned disadvantages. To achieve the aforementioned object in avoiding the cited disadvantages, the present disclosure provides for an off-road competition motorcycle having the features described herein after.

SUMMARY OF THE INVENTION

Disclosure of the Invention

There is disclosed hereby an off-road competition motorcycle including an internal combustion engine, having at least one cylinder, and a front wheel as well as a rear wheel, a tubular trellis frame and a self-supporting fuel tank configured as a rear tank mounted at the rear end of the off-road competition motorcycle, releasably secured to the tubular trellis frame, wherein the rear tank is the sole fuel tank of the off-road competition motorcycle and a lower portion of the rear tank extends by its bottom in the yaw axis direction of the off-road competition motorcycle into the region of one end of the tubular trellis frame.

There is achieved by the presently disclosed apparatus a configuration in which a fuel accommodating portion of the rear tank, still having fuel down to lowest level in the rear tank, is disposed underslung in the yaw axis direction of the off-road competition motorcycle. The portion of the rear tank, in extending as far as a juncture of the framework of the tubular trellis frame, thus enables this portion to saddle the juncture of the framework of the tubular trellis frame, located sideways in the longitudinal centerline of the motorcycle, so that for joining the rear tank to the tubular trellis frame a basis is now available to handle transverse forces by directing them into the tubular trellis frame via the rear tank. The tank is configured as a self-supporting fuel tank, in thus no longer making it necessary to extend the tubular trellis frame of the off-road competition motorcycle in accordance with the present disclosure by, for example, a bolted rear frame.

Configuring the rear tank so that a bottom portion extends into the region of junctures of the framework of the tubular trellis frame results in the load on the rear wheel of the upright off-road competition motorcycle being greater than the load on the front wheel; the rear wheel load preferably amounts to at least 53.5% of the deadweight of the off-road competition motorcycle, which is an unexpected advantage.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 1:
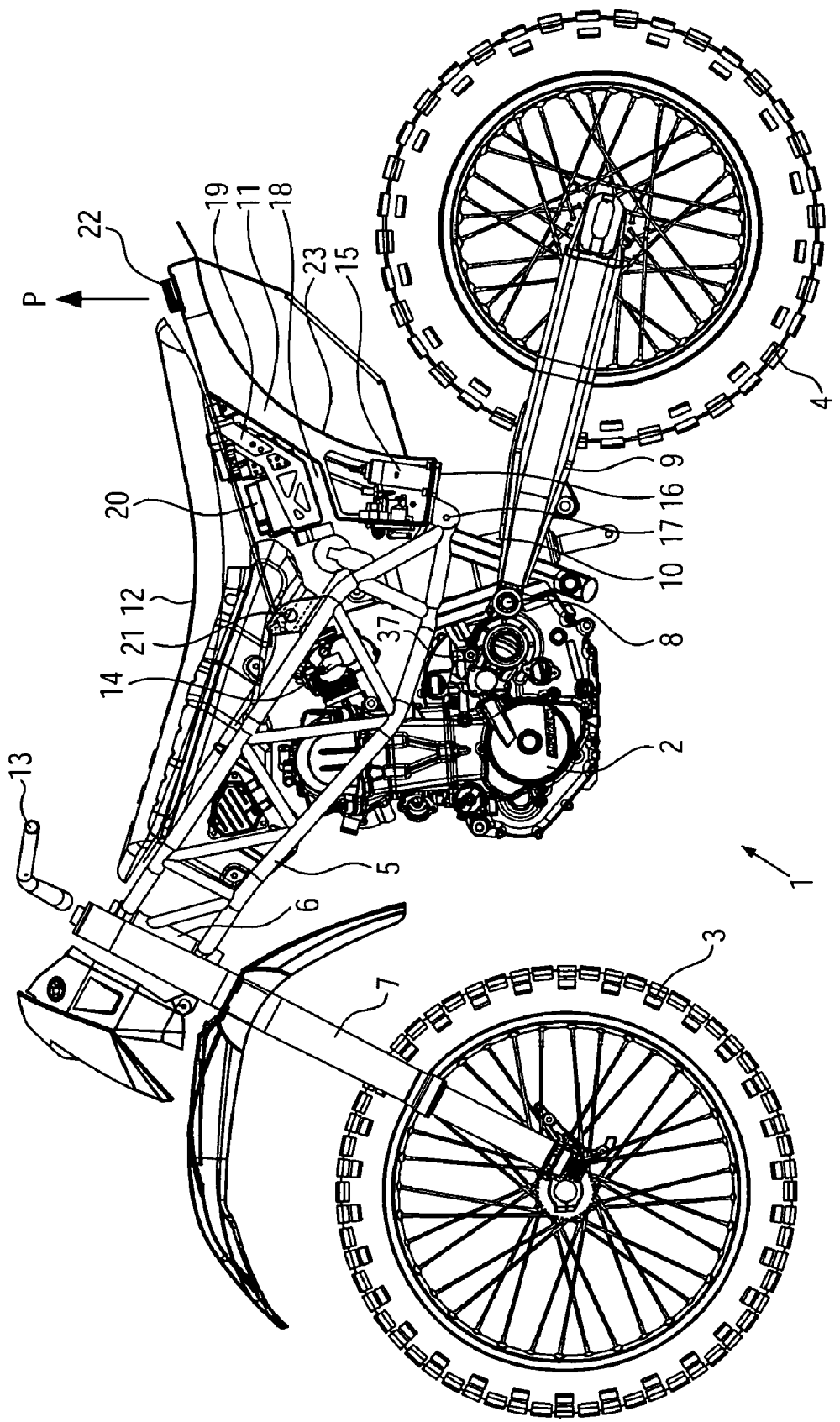
FIG. 1 is a partly sectioned side view of one embodiment of an off-road competition motorcycle according to the present disclosure.

Best Modes for Carrying Out the Invention

There is disclosed hereby an off-road competition motorcycle including an internal combustion engine, having at least one cylinder, and a front wheel as well as a rear wheel, a tubular trellis frame and a self-supporting fuel tank configured as a rear tank mounted at the rear end of the off-road competition motorcycle, releasably secured to the tubular trellis frame, wherein the rear tank is the sole fuel tank of the off-road competition motorcycle and a lower portion of the rear tank extends by its bottom in the yaw axis direction of the off-road competition motorcycle into the region of one end of the tubular trellis frame.

The disclosed off-road competition motorcycle apparatus has a configuration in which a fuel-accommodating portion of the rear tank is disposed underslung in the yaw axis direction. This portion of the rear tank, in extending as far as a juncture of the framework of the tubular trellis frame, enables this portion to saddle the juncture of the framework of the tubular trellis frame, located sideways in the longitudinal centerline of the motorcycle; so that for joining the rear tank to the tubular trellis frame, a basis is now available to handle transverse forces by directing them into the tubular trellis frame via the rear tank.

The tank is configured as a self-supporting fuel tank, eliminating the need to extend the tubular trellis frame of the presently disclosed motorcycle by, for example, employing a bolted rear frame.

Configuring the rear tank so that a bottom portion of it extends into the region of junctures of the framework of the tubular trellis frame results in the load on the rear wheel of the motorcycle, when in an upright position, being greater than the load on the front wheel. In this apparatus, the rear wheel load preferably, and advantageuosly, amounts to at least 53.5% of the deadweight of the motorcycle.

This wheel loading is achieved even when no fuel is in the rear tank, but when the off-road competition motorcycle is fully operational with all fluids and lubricants. Depending on how much fuel is in the rear tank, the load on the rear wheel changes so that, the more the tank is filled, the higher the rear wheel load—in accordance with this disclosure, the load on the rear wheel of the upright motorcycle is in the range of 53.5% to 56% of the deadweight of the motorcycle. The load on the rear wheel can thus be from about 53.5% to about 56% of the deadweight of the off-road competition motorcycle, depending on how much fuel is in the rear tank.

This loading scheme achieves a slightly tail-heavy configuration of the off-road competition motorcycle which, together with the lack of a front tank, offers many advantages. Due to the load on the rear wheel being higher than on the front wheel, it is now achieved that even at higher engine output the rear wheel loses ground grip much later than is the case with known off-road competition motorcycles. This results in less shimmy of the rear wheel in the acceleration phase of the off-road competition motorcycle in accordance with the invention and thus in a smoother rear ride.

In addition to the foregoing functions and advantages, the rear wheel can now also communicate more braking power than is the case of known off-road competition motorcycles. This is because to avoid overbraking the front wheel, when negotiating slippy terrain, it is more important to communicate sufficient braking force to the rear wheel than is the case with road racing motorcycles; the braking effect for the latter is substantially achieved by communication of the braking force to the front wheel, with braking the rear wheel normally having a slightly supporting auxiliary braking function. In downhill braking too, the rear tank is of advantage since it diminishes the tendency of the off-road competition motorcycle to forward toppling, by the center of gravity of the rear tank loading the rear wheel with no force component materializing from forward sloshing of the fuel in the saddle tank during braking, promoting rotation of the motorcycle about the axis of rotation of the front wheel.

When a known off-road competition motorcycle having a front tank is negotiating rough terrain, the fuel in the front tank is sloshed to and fro, causing jolting not only in the longitudinal centerline of the motorcycle but also transversely thereto, again introducing unsteadiness in the chassis of the known off-road competition motorcycle. This is more so with a downswept saddle tank, wherein the fuel level in both side tanks of the saddle tank may differ, possibly causing a force action about the yaw axis of the known off-road competition motorcycle. These disadvantages are eliminated in the motorcycle apparatus of the present disclosure; fuel sloshing in the front tank is now impossible because the front tank is totally eliminated.

Now, when the biker of the off-road competition motorcycle in accordance with this disclosure is required to negotiate a surface obstacle in the form of, for example, surface irregularities or a stone, simply briefly increasing engine power is sufficient to yank up the front wheel of the motorcycle, up and over the obstacle without hitting it. This avoids the chassis being jolted by the front wheel hitting the obstacle in the terrain. In a known off-road competition motorcycle featuring a saddle tank yanking up the front wheel is much more difficult due to the deadweight of the fuel tank full with fuel.

Depending on the nature of the surface being negotiated, it may be necessary for engine output to be briefly throttled or boosted. When this happens with a conventional off-road competition motorcycle featuring a saddle tank, fuel sloshing can result in jolting to the detriment of the response of the motorcycle, including an increase in the undamped mass forces located high above the motorcycle's center of gravity. This is because the fuel sloshing to and fro in the saddle tank has the response of a near freely oscillating mass body. In front wheel braking of the known off-road competition motorcycle, the forward sloshing of the fuel puts an additional strain on the front wheel shock fork, amplifying the dive thereof. This effect changes with the difference in the fuel level in the saddle tank, resulting in a change in the handling response of the motorcycle as a function of the fuel level. This effect is now substantially reduced by the rear tank with a low-lying center of gravity of the fuel.

In one aspect of the present apparatus, it is provided for that the bottom of the rear tank features an electrically operated fuel pump for supplying fuel to a fuel injector system of the engine. When a saddle tank with its downswept side tanks needs to be emptied, a fluid communication in the form of flexible tubing or the like is needed between the two side tanks, since otherwise each of the latter would have to be provided with a fuel pump. When these fuel pumps are located way down in the side tanks, they are endangered when the motorcycle topples. In other words, when an off-road competition motorcycle having such a saddle tank topples, the hazard of the underslung side tanks coming into ground contact is exceptionally high, risking damage to the saddle tank and probably also to the fuel pumps located in this area. By providing the fuel pump at the bottom of the rear tank, in the off-road competition motorcycle according to this disclosure, the rear tank can be fully emptied by the fuel pump. This adds to the mileage availability, as is often not the case with a saddle tank because fuel remainders in the side tanks of the saddle tank can not be fully emptied by the fuel pump. Additionally, the fuel pump in the rear tank is now safely remote from the topple hazard area.

The rear tank provided on the off-road competition motorcycle in accordance with the present disclosure also makes it possible to relocate other components necessary for operating the motorcycle remote from topple hazard areas. Thus, in another advantageous aspect of the apparatus, it is provided that the top of the rear tank is recessed for locating an insert for mounting at least one controller for the engine, and/or a controller for a fuel injector system of the engine, and/or a battery of the vehicle electrics together with relays and fuses therefor. Accordingly, components essential to continued operation of the off-road competition motorcycle in the form of, for example, the cited controllers or for the battery and other electrical system components may now be located on the motorcycle where they are less exposed to a topple hazard: namely, underneath the seat of the presently disclosed motorcycle, remote from the topple hazard area.

In addition, locating the battery in this way achieves that its center of gravity, as viewed in the yaw axis direction of the motorcycle, is above the lower portion of the rear tank and its bottom, displaced slightly forward in the longitudinal centerline of the vehicle. This allows the battery to be located near to the center of gravity of the motorcycle.

Known off-road competition motorcycles feature as a stone impact guard an inner fender below the seat at the rear end of the frame which needs to be fitted additionally as a separate component. It is here that the rear tank configuration according to the present disclosure integrates this function, due to the rear tank being configured as an arcuate segment in the region facing the rear wheel. This arcuate segment of the tank is downswept from the bottom to below a fuel filler port in the top of the rear tank, so that this arcuate segment doubles as a fender without a separate component being needed for this purpose.

Ever stricter noise abatement regulations are making it necessary to mute the intake noise of the engine in off-road competition motorcycles. In addition to this, it is necessary to boost the intake to correspondingly fully exploit the output of the engine, and thus to ensure that the intake in the cylinder is not reduced by avoidable friction losses in the intake area. Both of these requirements are presently satisfied by a large-size air box which, in one aspect of the apparatus, is disposed between the top of the rear tank and a handlebar header pipe of the tubular trellis frame, in the region between side covers of the tubular trellis frame and beneath a seat of the motorcycle. This thus makes use of a large space, available between the rear tank and the handlebar header pipe of the tubular trellis frame, for configuring the air box. This makes it possible to provide in the air box a correspondingly large plenum space for the oscillating air column and for damping the intake snorting of the engine.

In this arrangement, the air box is disposed between side covers of the tubular trellis frame and beneath a seat of the motorcycle, and thus being located remote from a topple hazard area. Further, its elongated design, in conjunction with the waisted tubular trellis frame, now makes it possible to render the presently disclosed motorcycle waisted in the knee contact area, i.e., in the area in which the knee or thigh of the biker seated on the motorcycle is located, or when the biker is standing on the footrests of the motorcycle. This permits the rider to stand on the footrests without any unnatural side spread of his knees. This waisted design also results in the biker, when seated, now having a more effective leg length to protect himself from toppling by leg action when negotiating rough terrain, since he now no longer needs to widespread his legs because of the wide front tank.

However, the configuration provided in accordance herewith also facilitates maintenance of the motorcycle. For instance, when servicing the cylinder head in tuning the valves or the like, all that is needed is to remove the seat and the air box to gain access to the cylinder head from above, thus expediting maintenance without having to remove a lot of components of the motorcycle. In particular, there is now no need to remove a saddle tank, which when full or partly full is heavy, from the frame with all the hassle involved to gain access to the cylinder head.

Maintenance also is further facilitated by the rear tank being hinge mounted on the tubular trellis frame. The rear tank is so mounted such that, relative to the tubular trellis frame, it can be hinged to swing or pivot upwards at two hinge locations on the frame for free access to a rear wheel shock of the motorcycle (so as to tune or replace the strut integrating the shock).

In accordance with yet another aspect of the presently disclosed apparatus, there is located in the side wall of the air box is an engine breather fluidly communicating with the air box and the cylinder head of the engine. The breather features a housing which is arranged mostly within a framework delta of the tubular trellis frame, this in turn facilitating access to the engine breather for maintenance without needing to remove a lot of components from the motorcycle. In this arrangement, the engine breather serves to de-oil blow-by and air from the crankcase and the common casing housing the engine and gearbox. These gases access the cylinder head via a chainway in which a chain for driving the camshafts of the engine runs. From the cylinder head they are fluidly communicated to the inlet of the engine breather. These oil-misted gases are then de-oiled in the engine breather by the oil being deposited on the walls. The collected engine oil is then returned via a further port in the engine breather to the engine, again correspondingly fluidly communicated to an inlet port in the casing of the engine and gearbox of the engine, respectively. The gases in the engine breather can be directed via a fluid port into the air box in thus being made available for combustion by the engine.

In a further aspect of the invention it is also provided for that the rear tank in accordance with the invention is made of a plastics material, thus reducing the overall weight of the off-road competition motorcycle.

Referring now to FIG. 1 there is illustrated in a partly sectioned side view one embodiment of an off-road competition motorcycle 1 according to this disclosure in which, to simplify the illustration a few components (such as, for instance, brake discs, catalytic muffler, engine to rear drive chain as well as instrumentation controls) have been omitted.

The off-road competition motorcycle 1 as shown comprises an internal combustion engine 2 which in the embodiment shown is a single-cylinder engine, although, of course, an embodiment with some other engine, such as, for example, a V2 engine is just as possible.

As directly evident, the motorcycle comprises a front wheel 3 and a rear wheel 4. A tubular trellis frame 5 features at its forward end a handlebar header pipe 6 and mounts on for bridges (not shown) a front wheel fork 7 incorporating a shock.

The engine 2 is configured as a component aiding by a link 8 to mount a rear swing arm 9 guiding the rear wheel 4. The rear wheel 4 is supported by the rear swing arm 9 and a strut 10 at the tubular trellis frame 5; the strut 10 as viewed in the forward direction of the motorcycle being disposed ahead of a rear tank 11 and beneath a seat 12 for seating the biker (not shown) steering the off-road competition motorcycle 1 by means of the handlebars 13.

The off-road competition motorcycle 1 as shown features no saddle tank or further auxiliary tank which, conventionally, would be positioned between the handlebar header pipe 6 and a user seated on the seat 12. The engine 2 is fuelled by a fuel injector system, a throttle being incorporated in a throttle mount 14 at the inlet end, the opening of the throttle being variable by means of a gas twist grip (not shown) on the handlebars 13.

The pressure needed by the fuel injector system is made available by a fuel pump 15 secured to the bottom of the rear tank 11, the rear tank 11 extending as far as the juncture 17 of the framework of the tubular trellis frame 5. The tank 11 thus attains an underslung location of any fuel remaining therein until total emptying of the rear tank; thus the rear wheel 4—and not the front wheel as is the case in known off-road competition motorcycles—is loaded.

The rear tank 11 structured as a self-supporting element—a rear frame as on known off-road competition motorcycles no longer being needed. The tank 11 features at the top thereof a recess 18 for insertion of an insert 19 for mounting at least one controller for the engine, and a controller for a fuel injector system of the engine, and/or a battery 20 for the electrics of the off-road competition motorcycle 1. Any or perhaps all these components may be inserted in the recess 18 preassembled in the insert 19 for ready removal therefrom to facilitate maintenance.

Figure 2:
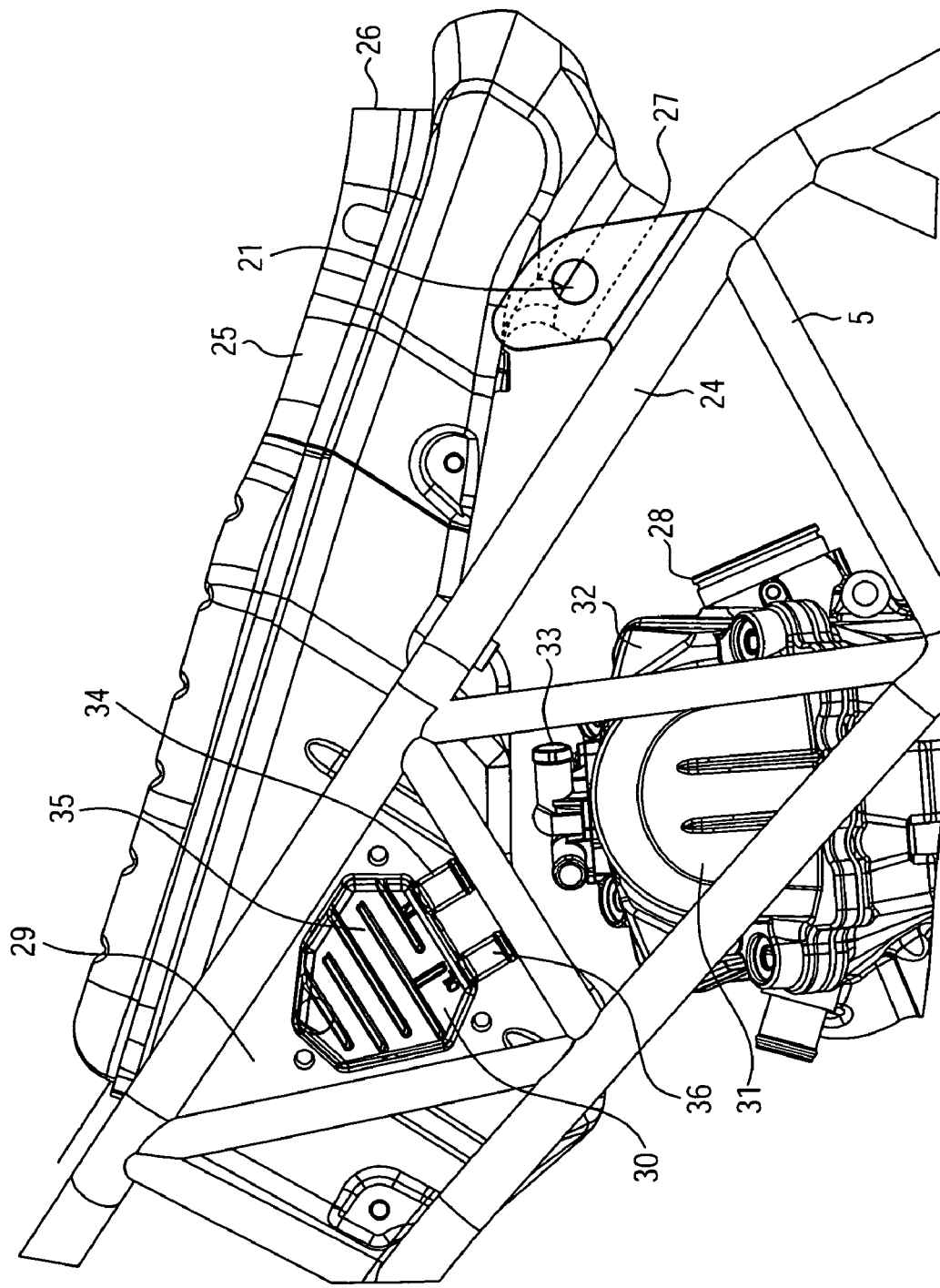
FIG. 2 is a magnified view of the air box and engine breather as shown in FIG. 1.
Figure 3:
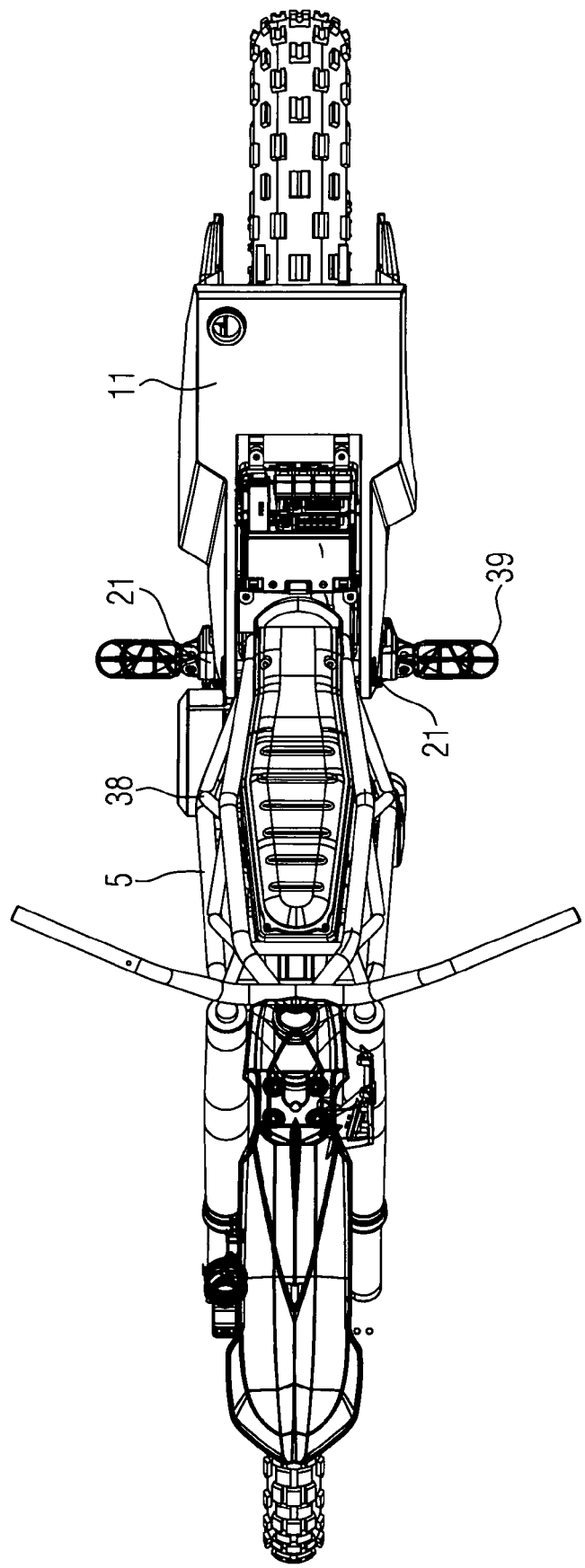
FIG. 3 is a plan view of the off-road competition motorcycle as shown in FIG. 1.

Maintenance can be facilitated, for example, by (after having removed a silencer (not shown)) hingedly pivoting the rear tank 11 upwards as indicated by the directional arrow P (FIG. 1), after removing the seat 12 and releasing a fastener in the region of the juncture 17. This permits access to the strut 10. Hinging the rear tank 11 in this arrangement, for upward pivotal or swinging movement, is accomplished by hinge locations 21 as shown in FIGS. 1-3. Hinges may be formed, for example, by bolts with bushings by which the rear tank 11 is hinged to the tubular trellis frame 5 or to an extension of the tubular trellis frame 5.

By configuring the off-road competition motorcycle with only a rear tank 11 as the sole fuel tank, a beneficial distribution of the wheel loading is realized. With the off-road competition motorcycle 1 upright, at least approximately 53.5% of the deadweight of the off-road competition motorcycle is supported by the footprint of the rear wheel 4. It has been determined to be of advantage when the load on the rear wheel 4 of the off-road competition motorcycle 1 when upright most preferably is in the range of between about 53.5% and about 56% of the deadweight of the off-road competition motorcycle 1. Thus, for example, wheel loading values of 53.5%, 53.6%, 53.7%, 53.8% etc. up to 55.5%, 55.6%, 55.7%, 55.8%, 55.9% and 56% are possible, with further intermediate values in the cited range limits of 53.5% to 56%, whereby these values may relate to an off-road competition motorcycle 1 in which the rear tank 11 is still empty. The values also may relate to an off-road competition motorcycle 1 according to the present disclosure in which the rear tank 11 is partly or fully filled with fuel.

To fuel the rear tank 11 with a capacity of, for example, 8 to 20 liters, a fuel filler port 22 is provided in the top of the rear tank 11. Extending down below this fuel filler port 22 is an arcuate segment portion 23 (FIG. 1) of the rear tank 11 which doubles as a fender, starting from the bottom 16 and preventing stones or other debris thrown up by the rear wheel 4 from being forwarded in the direction of the strut 10, throttle mount 14 or other components.

An elongated air box 25 for filtering intake air or deadening snorting of the engine 2 is disposed in the region between upper tubes 24 (FIG. 2) of the tubular trellis frame 5 and beneath the seat 12. By locating an intake portion 26 beneath the seat 12 where it is protected from dirt ingression, intake air enters the air box 25 in which it is diverted and filtered to ultimately exit the air box via an outlet 27 before being supplied via intake air conduits (not shown) and the throttle mount 14 (omitted from FIG. 2 for clarity) to the intake tract 28 of the engine.

As directly evident from FIG. 2 there is arranged in a framework delta 29 of the tubular trellis frame 5 an engine breather 30 secured to the outside of the air box 25 for facilitated maintenance, and comprising a communicating port to the inner side of the air box 25. Via a chainway 31, the crankcase of the engine 2 can be vented to the cylinder head 32 featuring an outlet port 33, which can be connected by fluid communication to an inlet 34 of the engine breather 30, so that the gas/oil mist mixture can enter the engine breather 30 from the crankcase. The oil mist is separated in the engine breather 30 via ridges 35 to run, via an outlet 36 fluidly communicated (not shown) to an inlet 37 of the casing housing, the engine and gearbox in common whilst the remaining gases can enter via the communicating port into the air box 25 from the engine breather 30 and supplied to combustion.

Figure 4:
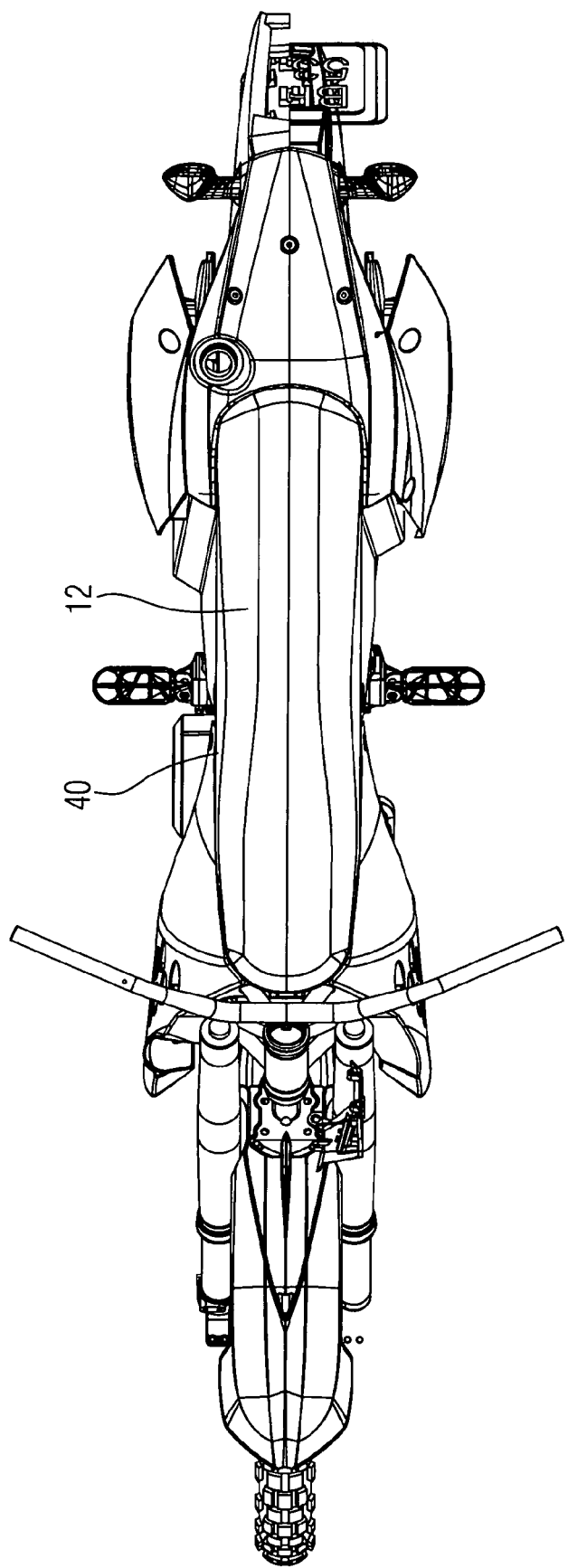
FIG. 4 is a plan view similar to that as shown in FIG. 3, showing the off-road competition motorcycle with fitted components.

Referring now to FIG. 3 of the drawings, there is illustrated a plan view of the off-road competition motorcycle as shown in FIG. 1, directly indicating the "waisted" structure of the off-road competition motorcycle in accordance with the this disclosure. Disposed between the rear tank 11 and the widest location 38 of the tubular trellis frame 5 (as viewed in the forward direction of the motorcycle), level with the footrests 39, is a waisted portion in the forward direction of the motorcycle, forming the knee contact zone of the biker when standing on the footrests 39. This defines a portion in which the knees of the biker are not spread in the outwards direction from any components of the apparatus. Even when the biker is seated on the seat 12, his knees hug the waisted portion of the off-road competition motorcycle identified by reference numeral 40 in FIG. 4. The user's legs thus are not necessarily spread outwards in having to straddle the saddle tank. This desirably waisted configuration of the off-road competition motorcycle 1 is achieved by eliminating the saddle tank (as otherwise usual in the art). The user of the off-road competition motorcycle 1 apparatus of this disclosure accordingly has a region of extended movement on the seat 12 without a wide saddle tank, which would otherwise hamper his freedom of movement when negotiating difficult, rough terrain or also on a paved surface.

As regards other features of the invention not detailed above, reference is expressly made to the claims and drawings.

A list of reference numerals used in the drawing figures is provided to promote the disclosure of one embodiment of the apparatus of the invention:

LIST OF REFERENCE NUMERALS 1 off-road competition motorcycle
2 internal combustion engine
3 front wheel
4 rear wheel
5 tubular trellis frame
6 handlebar header pipe
7 front fork
8 link
9 rear swing arm
10 strut
11 rear tank
12 seat
13 handlebars
14 throttle mount
15 fuel pump
16 bottom
17 juncture
18 recess
19 insert
20 battery
21 hinge location
22 fuel filler port
23 portion
24 upper tubes
25 air box
26 air intake
27 outlet
28 intake tract
29 framework delta
30 engine breather
31 chainway
32 cylinder head
33 outlet port
34 inlet
35 ridges
36 outlet
37 inlet
38 location
39 footrests
40 location
P arrow Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all patents and publications cited above are hereby incorporated by reference.

What is claimed is:

1. An off-road competition motorcycle comprising:
   a tubular trellis frame (5);
   an internal combustion engine (2) mounted on the frame;
   a front wheel (3) and a rear wheel (4) mounted on the frame; and
   a fuel tank (11) mounted at a rear end of the off-road competition motorcycle (1) and releasably secured to said tubular trellis frame (5);
   wherein said tank (11) comprises a sole fuel tank of said off-road competition motorcycle (1), and a lower portion of said tank (11) extends by its bottom (16) toward a yaw axis of said motorcycle (1) to an end of the tubular trellis frame (5).

2. The off-road competition motorcycle as set forth in claim 1, wherein said motorcycle has a deadweight that applies a load on said rear wheel (4) of the off-road competition motorcycle (1) when the motorcycle is upright, and wherein further said load comprises at least approximately 53.5% of said deadweight.

3. The off-road competition motorcycle as set forth in claim 2, wherein said load on said rear wheel (4) of the upright off-road competition motorcycle (1) is between approximately 53.5% and approximately 56% of said deadweight.

4. The off-road competition motorcycle as set forth in claim 1 further comprising an electrically operated fuel pump (15), at said bottom (16) of said tank (11), for supplying fuel to a fuel injector system of the engine (2).

5. The off-road competition motorcycle as set forth in claim 1, wherein a top of said tank (11) is recessed for locating an insert for mounting at least one member selected from the group consisting of a controller for the engine (2); a fuel injector system of the engine (2); and a battery (20).

6. The off-road competition motorcycle as set forth in claim 1, wherein said tank (11) comprises an arcuate segment in a region (23) facing said rear wheel (4), said arcuate segment extending from said bottom (16) to below a fuel filler port (22) in a top of said tank (11).

7. The off-road competition motorcycle as set forth in claim 1 further comprising an air box (25), disposed between a top of said tank (11) and a handlebar header pipe (6) of said tubular trellis frame (5) in a portion (23) between side covers (24) of said tubular trellis frame (5), and beneath a seat (12) of said motorcycle (1).

8. The off-road competition motorcycle as set forth in claim 7 further comprising an engine breather located in a side wall of said air box (25), said engine breather (30) fluidly communicating with said air box (25) and a cylinder head (32) of said engine (2), and having a housing arranged substantially within a framework delta (29) of said tubular trellis frame (5).

9. The off-road competition motorcycle as set forth in claim 1, wherein said tank (11) is hinge-mounted on said tubular trellis frame (5) for pivotal upward movement relative to said tubular trellis frame (5).

10. The off-road competition motorcycle as set forth in claim 1, wherein said tank (11) comprises a plastic.

11. An off-road competition motorcycle comprising:
a tubular trellis frame;
an internal combustion engine (2) mounted on the frame;
a front wheel (3) and a rear wheel (4) rotatably mounted on the frame; and
a self-supporting fuel tank configured as a rear mounted tank (11) mounted at a rear end of the off-road competition motorcycle (1) and releasably secured to said tubular trellis frame (5);
wherein said tank (11) comprises a sole fuel tank of said off-road competition motorcycle (1), and a lower portion of said tank (11) extends by its bottom (16) toward a yaw axis of said motorcycle (1) to a vicinity of one end of the tubular trellis frame (5).

12. The off-road competition motorcycle as set forth in claim 11, wherein said motorcycle has a deadweight that applies a load on said rear wheel (4) of the off-road competition motorcycle (1) when the motorcycle is upright, and wherein further said load comprises at least approximately 53.5% of said deadweight.

13. The off-road competition motorcycle as set forth in claim 12, wherein said load on said rear wheel (4) of the upright off-road competition motorcycle (1) is between approximately 53.5% and approximately 56% of said deadweight.

14. The off-road competition motorcycle as set forth in claim 11 further comprising an electrically operated fuel pump (15), at said bottom (16) of said tank (11), for supplying fuel to a fuel injector system of the engine (2).

15. The off-road competition motorcycle as set forth in claim 14, wherein a top of said tank (11) is recessed for locating an insert for mounting at least one member selected from the group consisting of a controller for the engine (2); a fuel injector system of the engine (2); and a battery (20).

16. The off-road competition motorcycle as set forth in claim 15, wherein said tank (11) comprises an arcuate segment in a region (23) facing said rear wheel (4), said arcuate segment sweeping from said bottom (16) to below a fuel filler port (22) in the top of said tank (11).

17. The off-road competition motorcycle as set forth in claim 11 further comprising an air box (25), disposed between a top of said tank (11) and a handlebar header pipe (6) of said tubular trellis frame (5) in a portion (23) between side covers (24) of said tubular trellis frame (5), and beneath a seat (12) of said motorcycle (1).

18. The off-road competition motorcycle as set forth in claim 17 further comprising an engine breather located in a side wall of said air box (25), said engine breather (30) fluidly communicating with said air box (25) and a cylinder head (32) of said engine (2), and having a housing arranged substantially within a framework delta (29) of said tubular trellis frame (5).

19. The off-road competition motorcycle as set forth in claim 18, wherein said tank (11) is hinge-mounted on said tubular trellis frame (5) for pivotal upward movement relative to said tubular trellis frame (5).

20. An off-road competition motorcycle comprising:
a tubular trellis frame;
an internal combustion engine (2) mounted on the frame and having at least one cylinder;
a front wheel (3) and a rear wheel (4) on the frame; and
a self-supporting fuel tank configured as a rear mounted tank (11) hinge-mounted at a rear end of the off-road competition motorcycle (1) and pivotally upward relative to said tubular trellis frame (5);
wherein said motorcycle has a deadweight and applies a load on said rear wheel (4) of the upright off-road competition motorcycle (1), and further wherein said tank (11) comprises a sole fuel tank of said off-road competition motorcycle (1), and a lower portion of said tank (11) extends toward a yaw axis of said motorcycle (1) and to an end juncture of the tubular trellis frame (5), whereby said load on said rear wheel comprises at least approximately 53.5% of said deadweight.

21. The off-road competition motorcycle as set forth in claim 20, wherein when said off-road competition motorcycle is in an upright position said load on said rear wheel (4) of the off-road competition motorcycle (1) is between approximately 53.5% and approximately 56% of said deadweight.

22. The off-road competition motorcycle as set forth in claim 20, wherein a top of said tank (11) is recessed for locating an insert for mounting at least one member selected from the group consisting of a controller for the engine (2); a fuel injector system of the engine (2); and a battery (20).

23. The off-road competition motorcycle as set forth in claim 22, comprising an electrically operated fuel pump (15), at said bottom (16) of said tank (11), for supplying fuel to a fuel injector system of the engine (2).

24. The off-road competition motorcycle as set forth in claim 20, wherein said tank (11) comprises an arcuate segment in a region (23) facing said rear wheel (4), said arcuate segment extending from said bottom (16) to below a fuel filler port (22) in a top of said tank (11).

25. The off-road competition motorcycle as set forth in claim 24 further comprising an air box (25), disposed between the top of said tank (11) and a handlebar header pipe (6) of said tubular trellis frame (5) in a portion (23) between side covers (24) of said tubular trellis frame (5), and beneath a seat (12) of said motorcycle (1).

26. The off-road competition motorcycle as set forth in claim 25 further comprising an engine breather located in a side wall of said air box (25), said engine breather (30) fluidly communicating with said air box (25) and a cylinder head (32) of said engine (2), and having a housing arranged substantially within a framework delta (29) of said tubular trellis frame (5).

* * * * *